(12) United States Patent
Gaully et al.

(10) Patent No.: US 9,194,302 B2
(45) Date of Patent: Nov. 24, 2015

(54) CONTROL OF A FUEL METERING DEVICE FOR TURBOMACHINE

(75) Inventors: Bruno Robert Gaully, Marolles en Hurepoix (FR); Cecile Marot, Ploemeur (FR)

(73) Assignee: SNECMA, Paris (FR)

( * ) Notice: Subject to any disclaimer, the term of this patent is extended or adjusted under 35 U.S.C. 154(b) by 403 days.

(21) Appl. No.: 13/880,997

(22) PCT Filed: Oct. 14, 2011

(86) PCT No.: PCT/FR2011/052395
§ 371 (c)(1),
(2), (4) Date: Apr. 23, 2013

(87) PCT Pub. No.: WO2012/056142
PCT Pub. Date: May 3, 2012

(65) Prior Publication Data
US 2013/0213053 A1    Aug. 22, 2013

(30) Foreign Application Priority Data

Oct. 25, 2010   (FR) ..................................... 10 58716

(51) Int. Cl.
*F02C 9/26*    (2006.01)
*F02C 7/232*   (2006.01)
*F02C 9/48*    (2006.01)
*F02C 9/50*    (2006.01)

(52) U.S. Cl.
CPC . *F02C 9/26* (2013.01); *F02C 7/232* (2013.01); *F02C 9/263* (2013.01); *F02C 9/48* (2013.01); *F02C 9/50* (2013.01); *Y02T 50/671* (2013.01)

(58) Field of Classification Search
CPC ................ F02C 9/48; F02C 9/50; F02C 9/26; F02C 9/263; F02C 7/232
See application file for complete search history.

(56) References Cited

U.S. PATENT DOCUMENTS

| 4,078,378 A | * | 3/1978 | Gold ........................... 60/39.281 |
| 4,508,127 A | * | 4/1985 | Thurston ............................ 137/8 |
| 4,773,213 A |   | 9/1988 | Krukoski et al. |

(Continued)

FOREIGN PATENT DOCUMENTS

| EP | 0 122 100 | 10/1984 |
| EP | 0 273 848 | 7/1988 |

OTHER PUBLICATIONS

International Search Report Issued May 9, 2012 in PCT/FR11/52395 Filed Oct. 14, 2011.

*Primary Examiner* — Craig Kim
(74) *Attorney, Agent, or Firm* — Oblon, McClelland, Maier & Neustadt, L.L.P.

(57) ABSTRACT

A control of a fuel metering device for a turbine engine as a function of a weight flow rate setpoint includes responding to at least one validity criterion to select a weight flow rate from among: a weight flow rate calculated as a function of a position signal; a weight flow rate calculated as a function of the position signal and of at least one temperature measurement signal; a weight flow rate calculated as a function of the position signal and of at least one permittivity measurement signal; a weight flow rate calculated as a function of the position signal, of at least one temperature measurement signal, and of at least one permittivity measurement signal; and a weight flow rate calculated as a function of a temperature measurement signal, of a permittivity measurement signal, and of a volume flow rate measurement signal.

10 Claims, 3 Drawing Sheets

(56) References Cited

U.S. PATENT DOCUMENTS

| | | | |
|---|---|---|---|
| 4,809,499 A * | 3/1989 | Dyer | 60/39.281 |
| 5,305,597 A * | 4/1994 | Snow | 60/39.281 |
| 6,622,489 B1 * | 9/2003 | Najera et al. | 60/773 |
| 7,950,216 B2 * | 5/2011 | Dooley et al. | 60/39.463 |
| 8,650,851 B2 * | 2/2014 | Ouellet et al. | 60/39.281 |
| 8,925,328 B2 * | 1/2015 | Rodd et al. | 60/778 |
| 2013/0019842 A1 * | 1/2013 | Shaver et al. | 123/478 |

* cited by examiner

CONTROL OF A FUEL METERING DEVICE FOR TURBOMACHINE

BACKGROUND OF THE INVENTION

The invention relates to the general field of turbine engines. In particular, the invention relates to controlling the fuel flow rate of a turbine engine. It applies in preferred but non-limiting manner to the turbine engines used in the field of aviation.

In known manner, the fuel flow rate injected into the combustion chamber of a turbine engine is determined by a metering device having a slide, also known as a fuel metering valve (FMV). The fuel flow rate depends on the position of the slide.

A setpoint for the weight flow rate of fuel that is to be injected into the combustion chamber is evaluated by the engine computer. A technique that is conventionally used for controlling the position of the slide on the basis of the weight flow rate setpoint delivered by the computer is as follows.

As it moves, the slide varies a fuel flow section S through the metering device. The section S is also referred to as the open area of the metering device and it is easily expressed as a function of the position of the slide. In known manner, this section S is proportional to the volume flow rate of fuel when the pressure difference across the metering device is kept constant. The volume flow rate is equal to the weight flow rate divided by the density of the fuel. The density of the fuel is generally assumed to be constant throughout a mission of the turbine engine, and to be determined.

It is therefore possible to convert the fuel weight flow rate setpoint into a slide position setpoint.

A regulation loop then compares the slide position setpoint with the real position of the slide as measured by a sensor and determines a slide control signal.

The above-outlined control technique presents several drawbacks. Firstly, it does not take account of possible variation in the nature of the fuel used, nor of possible variation in the density of the fuel, e.g. as a result of a temperature variation. Furthermore, the metering device is generally not very accurate.

As a result, the fuel weight flow rate actually injected can differ from the weight flow rate setpoint. In other words, control may be inaccurate.

It is also known to use a flow meter in the fuel circuit in order to improve control accuracy.

For example, document U.S. Pat. No. 5,305,597 proposes using a measurement delivered by a flow meter to evaluate a calibration signal proportional to the instantaneous density of the fuel.

That document also proposes using an accuracy criterion for verifying the validity of the measurement delivered by the flow meter. More precisely, the measurement delivered by the flow meter is considered as being valid while it is constant and greater than a predetermined threshold for a predetermined period. When the measurement is not considered as being valid, the most recent value to be considered valid is used for determining the calibration signal.

Nevertheless, a flow meter may be affected by various types of failure. The accuracy criterion used by the above-mentioned document does not make it possible to detect a failure of any type or to adapt the fuel flow rate command as a function of a detected failure. Thus, it does not provide satisfactory accuracy in the event of the flow meter failing.

There thus exists a need to improve the accuracy with which the fuel flow rate of a turbine engine is controlled.

OBJECT AND SUMMARY OF THE INVENTION

The invention provides a method of controlling the position of a slide of a fuel metering device for a turbine engine as a function of a weight flow rate setpoint, the method comprising:
  a step of obtaining a position signal coming from a sensor suitable for measuring the position of the slide;
  a step of obtaining at least one measurement signal coming from a flow meter suitable for measuring a fuel flow rate in the metering device;
  a step of estimating at least one validity criterion for said at least one measurement signal;
  a step of determining the fuel weight flow rate through the metering device; and
  a step of controlling the position of the slide as a function of the determined weight flow rate and of the weight flow rate setpoint;
the method being characterized in that:
  said at least one measurement signal comprises first and second fuel temperature measurement signals, first and second fuel permittivity measurement signals, and first and second fuel volume flow rate measurement signals; and
  the determination step comprises acting as a function of said at least one validity criterion to select a weight flow rate from among:
    a weight flow rate calculated as a function of the position signal;
    a weight flow rate calculated as a function of the position signal and of at least one of said temperature measurement signals;
    a weight flow rate calculated as a function of the position signal and of at least one of said permittivity measurement signals;
    a weight flow rate calculated as a function of the position signal, of at least one of said temperature measurement signals, and of at least one of said permittivity measurement signals; and
    a weight flow rate calculated as a function of at least one of said temperature measurement signals, of at least one of said permittivity measurement signals, and of at least one of said volume flow rate measurement signals.

In other words, the invention proposes detecting a failure, if any, of the flow meter, by estimating at least one validity criterion, and selecting a weight flow rate as a function of the validity criterion. This makes it possible to select the most accurate available weight flow rate, given the failures, if any, of the flow meter. The invention thus makes it possible to improve control accuracy, even in the event of a flow meter failure.

The validity criterion may comprise a validity criterion for a temperature measurement, a validity criterion for a permittivity measurement, and a validity criterion for a volume flow rate measurement.

For example, if the validity criterion for the temperature indicates that the temperature measurement is valid, the validity criterion for the permittivity measurement indicates that the permittivity measurement is valid, and the validity criterion for the volume flow rate measurement indicates that the volume flow rate measurement is valid, then the control method may select the weight flow rate that is calculated as a function of the position signal, of at least one of said temperature measurement signals, and of at least one of said permittivity measurement signals, thereby giving the most accurate measurement under these circumstances. In general, for each combination of validity criteria, one of the calculated weight flow rates is the most accurate and can be selected.

The validity criterion may further comprise a secondary validity criterion for a volume flow rate measurement, estimated by comparing firstly the weight flow rate calculated as a function of at least one of said temperature measurement signals, of at least one of said permittivity measurement signals, and of at least one of said volume flow rate measurement signals, and secondly the weight flow rate calculated as a function of the position signal, of at least one of said temperature measurement signals, and of at least one of said permittivity measurement signals.

For a flow meter having a spinner, the spinner is generally not provided in redundant manner. This comparison makes it possible to detect a failure affecting the spinner and to take it into account when determining the weight flow rate.

Furthermore, the following characteristics taken singly or in combination enable the measurements to be consolidated effectively and reliably:

the validity criterion for a temperature measurement is determined by comparing the first and second temperature measurement signals with a temperature measurement range;

the validity criterion for a permittivity measurement is determined by comparing the first and second permittivity measurement signals with a permittivity measurement range;

the validity criterion for a temperature measurement and the validity criterion for a permittivity measurement are also determined as a function of a data set representing the density of a fuel as a function of temperature and of permittivity;

when the temperature or permittivity measurement range and the data set do not indicate that the first and second temperature or permittivity measurement signals are invalid, then the validity criterion for a temperature or permittivity measurement is also determined as a function of the difference between the first and second temperature or permittivity measurement signals;

the validity criterion for a volume flow rate measurement is determined by comparing the first and second volume flow rate measurement signals with a volume flow rate measurement range; and the validity criterion for a volume flow rate measurement is also determined as a function of a difference between the first and second volume flow rate measurement signals.

The invention also provides a computer program including instructions for executing a control method in accordance with the invention when the program is executed by a computer.

The invention also provides an electronic unit for controlling a turbine engine, said electronic unit having a memory containing a computer program in accordance with the invention.

By way of example, the electronic unit may be the computer of the turbine engine or it may be a unit that is specific to controlling the fuel flow rate.

The invention also provides an aircraft having a turbine engine and an electronic unit in accordance with the invention.

BRIEF DESCRIPTION OF THE DRAWINGS

The invention can be better understood on reading the following description made by way of non-limiting indication and with reference to the accompanying drawings, in which.

DETAILED DESCRIPTION OF IMPLEMENTATIONS

The invention is described below in the context of its application to a turbine engine which may, for example, be a gas turbine for propelling an airplane, a helicopter turbine, an industrial turbine, or an auxiliary power unit (APU) turbine.

Figure 1:
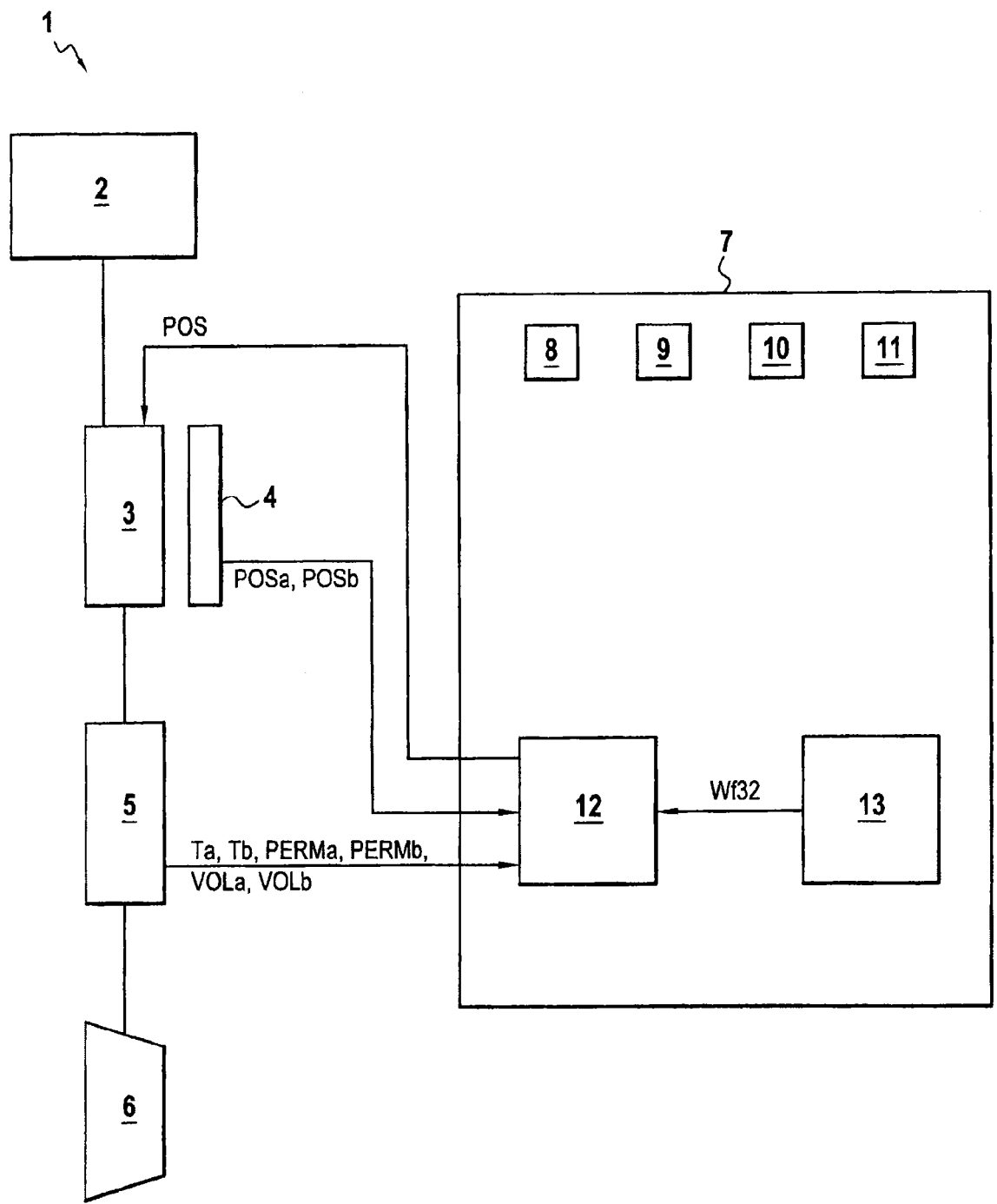
FIG. 1 is a diagram of the fuel feed circuit of a turbine engine and of the electronic control unit of the engine.

FIG. 1 shows a fuel feed circuit 1 for a turbine engine, together with the electronic control unit 7 of the engine.

The fuel feed circuit 1 comprises a tank 2, a metering device 3, a position sensor 4, and a flow meter 5. It is for feeding fuel to the combustion chamber 6 of the engine.

The metering device 3 also commonly referred to as a "metering" unit serves to control the quantity of fuel delivered by the feed circuit 1 to the combustion chamber 6. For this purpose, the metering device 3 has a slide (not shown) or an FMV. The flow section for the fuel, written S, and also referred to as the opening area of the metering device, depends on the position of the slide.

A member (not shown) keeps the pressure difference across the slide constant, and as a result the volume flow rate of fuel is proportional to the section S. It should be observed that the relationship between the section S and the position of the slide is itself known and is not described in greater detail.

The position sensor 4 measures the position of the slide of the metering device 3 and delivers a position signal to the electronic control unit 7. By way of example it may be a linear variable differential transformer (LVDT) type sensor. The position sensor 4 may be duplicated and it may deliver two position signals POSa and POSb to the electronic control unit 7.

By way of example the flow meter 5 may comprise a pair of meters, a spinner flow meter or a volume flow meter associated with a density measurement, where density is determined as a function of temperature and permittivity. Thus, the flow meter 5 provides a plurality of measurement signals to the electronic control unit 7: a temperature signal Ta and a temperature signal Tb representative of the temperature of the fuel in the feed circuit 1; a permittivity signal PERMa and a permittivity signal PERMb representative of the permittivity of the fuel in the feed circuit 1; and a volume flow rate signal VOLa and a volume flow rate signal VOLb representative of the volume flow rate of the fuel.

Below, the references Ta, Tb, PERMa, . . . are used to designate the measurement signal itself or the value that corresponds to the measurement signal. For example, Ta may also refer to the temperature represented by the measurement signal Ta. Similarly, POSa and POSb may refer to the positions represented by the position signals POSa and POSb.

The flow meter 5 is advantageously placed as close as possible to the metering device 3 so that the temperatures Ta and Tb and the permittivities PERMa and PERMb correspond respectively to the temperature and to the permittivity of the fuel in the metering device 3.

The electronic control unit 7 presents the hardware architecture of a computer. In particular, it comprises a processor 8, a read only memory (ROM) 9, a random access memory (RAM) 10, and an interface 11. The processor 8 serves to execute computer programs stored in the ROM 9 while using the RAM 10. The interface 11 serves in particular to obtain measurement signals and to issue control signals.

The electronic control unit 7 performs a method of controlling the position of the slide in the metering device 3. This control method may be performed by a computer program 12 stored in the ROM 9 and executed by the processor 8. The control method seeks to determine a position setpoint POS for the slide of the metering device 3 as a function of a fuel weight flow rate setpoint Wf32 for feeding the combustion chamber 6, and also of the position signals POSa, POSb and of the measurement signals Ta, Tb, PERMa, PERMb, VOLa, and VOLb.

In the example shown in FIG. 1, the electronic control unit 7 is the engine computer, and it performs a main regulation loop for determining the weight flow rate setpoint Wf32 as a function of the desired thrust. The main regulation loop is performed by a computer program 13 stored in the ROM 9 and executed by the processor 8.

In a variant, the control unit 7 may be a specific electronic unit for controlling the metering device 3, and it may receive the weight flow rate setpoint Wf32 from the engine computer, which is then a distinct unit.

Figure 2:
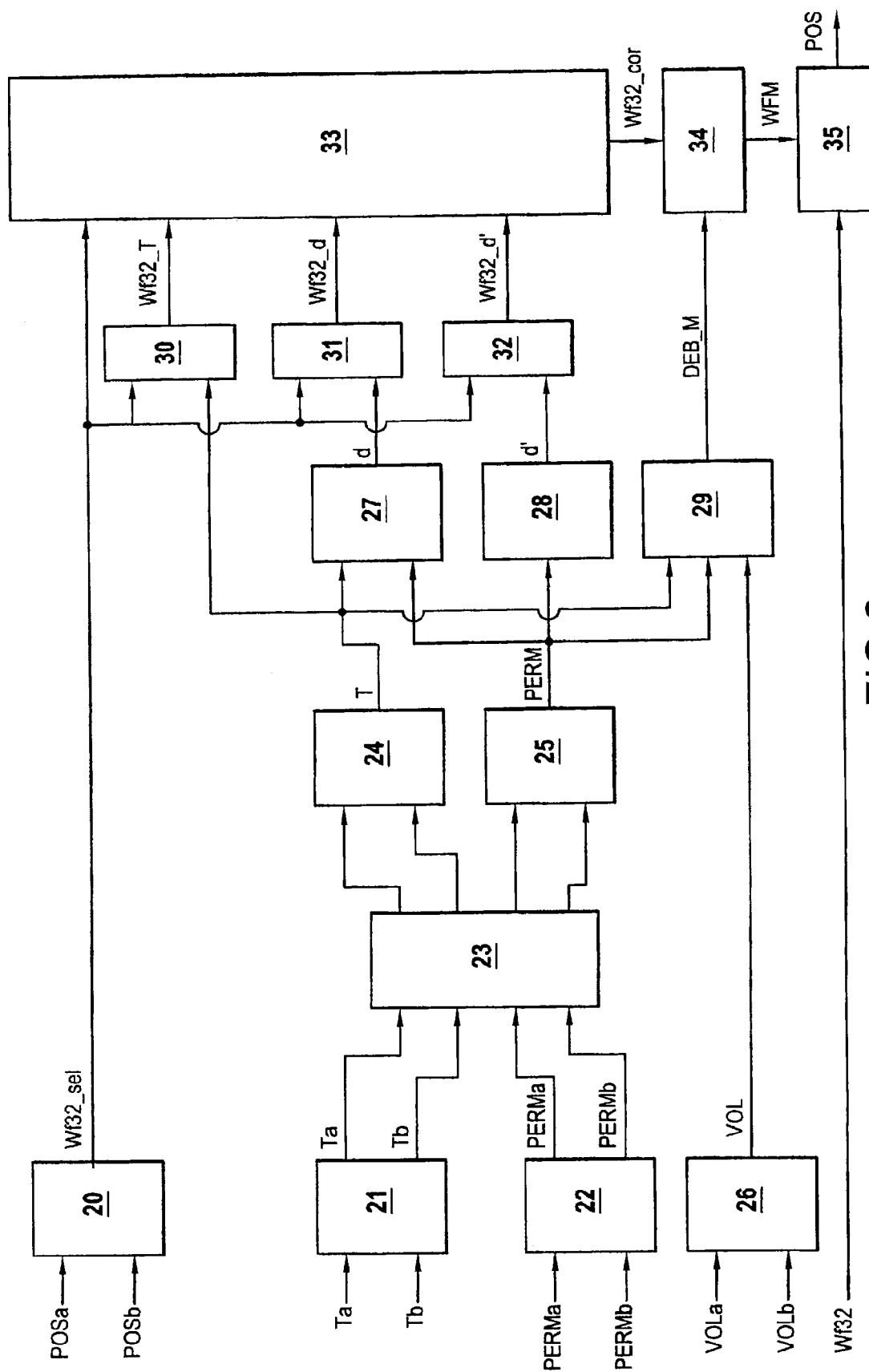
FIG. 2 is a diagram showing a portion of the operation of a control method in an implementation of the invention.

FIG. 2, in the form of functional modules, shows the main steps of the method of controlling the position of the slide in the metering device 3. As explained above, this control method is performed by a computer program 12 executed by the electronic control unit 7.

From the positions POSa and POSb, the module 20 determines a weight flow rate Wf32_sel. The weight flow rate Wf32_sel is determined by assuming that the density of the fuel is constant and predetermined. How to calculate Wf32_sel from the positions POSa and POSb is known to the person skilled in the art and is not described in greater detail.

The module 21 performs a first consolidation of the temperatures Ta and Tb. More precisely, the module 21 verifies that Ta and Tb lie within the temperature measurement range, e.g. in the range [−55° C., 150° C.]. If the temperature Ta or Tb is not in the temperature measurement range, the measurement of Ta or of Tb as the case may be is assumed to be invalid. This information is stored.

In corresponding manner, the module 22 performs a first consolidation of the permittivities PERMa and PERMb by verifying that PERMa and PERMb lie within the permittivity measurement range, e.g. in the range [1.88, 2.27]. If PERMa or PERMb is not within the permittivity measurement range, then the measurement PERMa or PERMb, as the case may be, is considered as being invalid. This information is stored.

The module 23 performs crossed consolidation between the temperatures Ta & Tb and the permittivities PERMa & PERMb.

In known manner, the density of a fuel varies with its temperature. Furthermore, for a given temperature, the permittivity of a fuel depends on the type of fuel. It is thus possible to construct a data set, e.g. a two-dimensional (2D) table that specifies, for given temperature and permittivity, either the corresponding density of the fuel, or else that the temperature-and-permittivity pair does not correspond to a fuel.

Thus, the module 23 makes use of such a data set for eliminating temperature-and-permittivity pairs that do not correspond to a fuel. If temperatures and permittivities are considered as being invalid, this information is stored.

Thereafter, the module 24 performs a second consolidation of the temperatures Ta and Tb, assuming they are still considered as being valid after the consolidations performed by the modules 21 and 23. More precisely, the module 24 verifies that the difference between Ta and Tb is less than a predetermined threshold, e.g. 0.25° C.

If the difference between Ta and Tb is greater than this threshold, or if neither Ta nor Tb is considered as being valid after the consolidations performed by the modules 21 and 23, then the information "temperature invalid" is stored, and the module 24 does not deliver any temperature.

In contrast, if the difference between Ta and Tb is less than or equal to the threshold, or if only one of the temperatures Ta and Tb is considered as being valid after the consolidations performed by the modules 21 and 23, then the information "temperature valid" is stored and the module 24 delivers a temperature T as follows:
    the average of Ta and Tb if both Ta and Tb are considered as being valid;
    Ta if only Ta is considered as being valid and Tb is considered as being invalid; and
    Tb if only Tb is considered as being valid and Ta is considered as being invalid.

The module 25 performs processing similar to that of the module 24 but for the permittivities PERMa and PERMb. Thus, the module 25 stores information "permittivity invalid" or "permittivity valid" and, if permittivity is valid, its delivers a permittivity PERM that may be the average of PERMa and PERMb, or one of the other of the permittivities PERMa and PERMb.

The module 26 performs consolidation on the volume flow rates VOLa and VOLb. More precisely, the module 26 verifies that VOLa and VOLb lie within the volume flow rate measurement range of the flow meter 5. If the flow rate VOLa or VOLb does not lie within the volume flow rate measurement range, then the measurement VOLa or VOLb is considered as being invalid, as appropriate. This information is stored. If VOLa and VOLb are considered as being valid, the module 26 also verifies that the difference between VOLa and VOLb is less than a predetermined threshold.

If the difference between VOLa and VOLb is greater than this threshold, or if neither VOLa nor VOLb is considered as being valid after verifying relative to the measurement range, then the information "volume flow rate invalid" is stored and the module 26 does not deliver any volume flow rate.

In contrast, if the difference between VOLa and VOLb is less than or equal to the threshold, or if only one of the flow rates VOLa and VOLb is considered as being valid after validation against the measurement range, then the information "volume flow rate valid" is stored and the module 26 delivers a volume rate VOL as follows:
    the average of VOLa and VOLb if VOLa and VOLb are both considered as being valid;
    VOLa if only VOLa is considered as being valid and VOLb is considered as being invalid; or
    VOLb if only VOLb is considered as being valid and VOLa is considered as being invalid.

On the basis of the temperature T delivered by the module 24 and of the permittivity PERM delivered by the module 25, the module 27 determines the density $\underline{d}$ of the fuel.

On the basis of the permittivity PERM delivered by the module 25, the module 28 determines an estimate d' of the density $\underline{d}$ of the fuel.

On the basis of the temperature T delivered by the module 24, of the permittivity PERM delivered by the module 25, and of the volume flow rate VOL delivered by the module 26, the module 29 determines a weight flow rate DEB_M.

On the basis of the weight flow rate Wf32_sel delivered by the module 20 and of the temperature T delivered by the module 24, the module 30 determines a temperature-corrected weight flow rate Wf32_T.

On the basis of the weight flow rate Wf32_sel delivered by the module 20 and of the density d delivered by the module 27, the module 31 delivers a density-corrected weight flow rate Wf32_d.

On the basis of the weight flow rate Wf32_sel delivered by the module 20 and of the estimate d' of the density delivered by the module 28, the module 32 determines a permittivity-corrected weight flow rate Wf32_d'.

Figure 3:
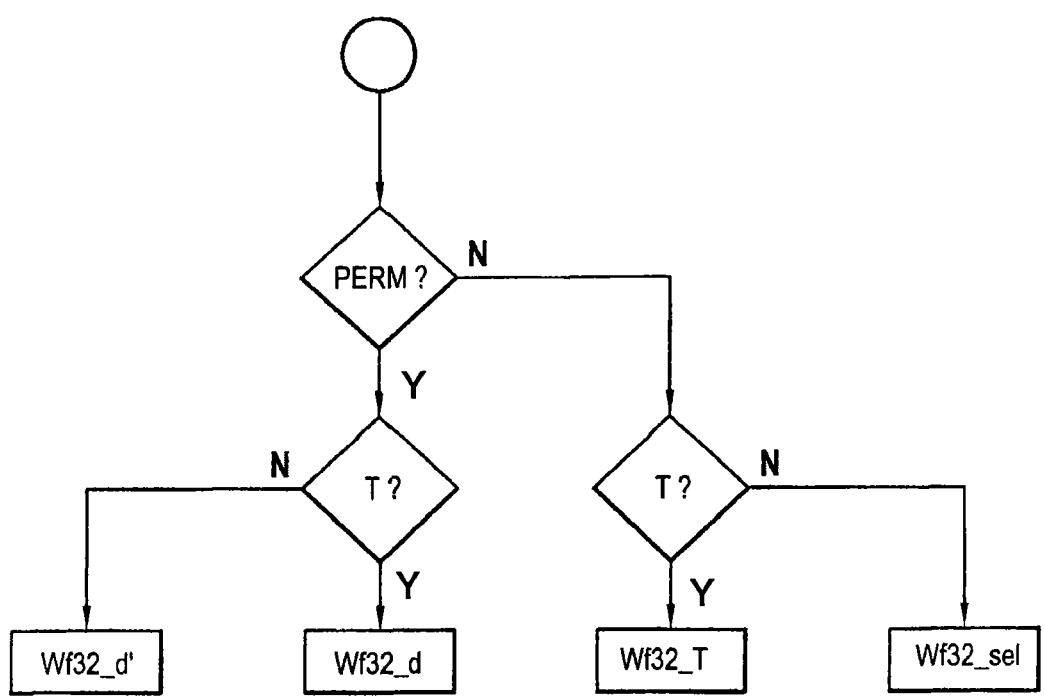
FIG. 3 shows in further detail a portion of the selection step in the control method of FIG. 2.

The module 33 selects a corrected weight flow rate Wf32_cor from the weight flow rate Wf32_sel, Wf32_T, Wf32_d, and Wf32_d', as a function of the validities of the temperature and permittivity measurements as determined by the modules 21 to 25. FIG. 3 shows the selection performed by the module 33 in greater detail:

If the permittivity is valid and the temperature is invalid, the module 33 selects the weight flow rate Wf32_d'.
If the permittivity and the temperature are valid, the module 33 selects the weight flow rate Wf32_d.
If the permittivity is invalid and the temperature is valid, then the module 33 selects the weight flow rate Wf32_T.
If both the permittivity and the temperature are invalid, then the module 33 selects the weight flow rate Wf32_sel.

As explained above, the information "temperature valid" or "temperature invalid" and "permittivity valid" or "permittivity invalid" used by the module 33 is determined and stored by the modules 24 and 25.

The module 34 delivers a weight flow rate WFM by selecting between the weight flow rate DEB_M delivered by the module 29 and the weight flow rate Wf32_cor delivered by the module 33.

More precisely, if the information "temperature valid", "permittivity valid", and "volume flow rate valid" has been stored, that means that the weight flow rate DEB_M, which is the flow rate determined as a function of the measurements of the flow meter 5, is unaffected by a failure and represents the most accurate measurement available. Under such circumstances, the weight flow rate WFM that is delivered is equal to DEB_M. In a variant, if the information "turbine valid", "permittivity valid", and "volume flow rate" has been stored, then the module 34 calculates the difference between DEB_M and Wf32_d. If this difference is greater than a predetermined threshold, that means that there is a problem in measuring the volume flow rate, e.g. a problem affecting the spinner if the flow meter is a spinner flow meter. Under such circumstances, the module 34 selects the weight flow rate Wf32_d instead of the weight flow rate DEB_M.

In contrast, if the information includes at least one of "temperature invalid", "permittivity invalid", and "volume flow rate invalid" stored therein, that means that the weight flow rate DEB_M, i.e. the flow rate determined as a function of the measurements of the flow meter 5 is affected by a failure. Under such circumstances, the weight flow rate WFM that is delivered is equal to Wf32_cor, i.e. the flow rate determined on the basis of the position of the slide of the metering device 3, possibly with a temperature correction and/or a permittivity correction if those measurements are valid.

The information "temperature valid" or "temperature invalid", "permittivity valid" or "permittivity invalid", and "volume flow rate valid" or "volume flow rate invalid" constitutes validity criteria for the measurement signals delivered by the flow meter 5. The processing performed by the modules 33 and 34 constitutes selecting a weight flow rate as a function of these validity criteria, in the meaning of the invention.

By selecting from among the various above-mentioned weight flow rates, as a function of measurement validity criteria, the FIG. 2 method serves to determine the weight flow rate WFM that is the most accurate available, given the failures that might affect the flow meter 5.

Finally, the module 35 compares the weight flow rate WFM with the weight flow rate setpoint Wf32 in order to determine a control signal POS for controlling the position of the slide of the metering device 3. For example, the module 35 calculates the difference WFM-Wf32 and makes use of a proportional-integral regulator.

In a variant, the method described above with reference to FIGS. 2 and 3 is performed during a steady stage, i.e. while the fuel flow rate is substantially constant. During a transient stage, in which the fuel flow rate varies, it is possible to select as the weight flow rate WFM, the weight flow rate DEB_M, Wf32_T, Wf32_d, Wf32_d', or Wf32_sel as selected during the preceding steady stage. It can be assumed that the risk of a new failure appearing during a transient stage is very small. The beginning and the end of a transient stage may be detected as a function of the positions POSa and POSb, for example.

Furthermore, when a measurement is considered as being invalid, it may be considered as being valid once more on crossing a rehabilitation threshold, e.g. set at or equal to ⅔ of the elimination threshold that led to it being considered invalid.

The invention claimed is:

1. A method of controlling a position of a slide of a fuel metering device for a turbine engine as a function of a weight flow rate setpoint, the method comprising:
    obtaining a position signal coming from a sensor configured to measure a position of the slide;
    obtaining at least one measurement signal coming from a flow meter configured to measure a fuel flow rate in the flow meter;
    estimating at least one validity criterion for the at least one measurement signal;
    determining a fuel weight flow rate through the flow meter; and
    controlling the position of the slide as a function of the determined weight flow rate and of the weight flow rate setpoint;
    the at least one measurement signal comprises first and second fuel temperature measurement signals, first and second fuel permittivity measurement signals, and first and second fuel volume flow rate measurement signals; and
    the determining comprises acting as a function of the at least one validity criterion to select a weight flow rate from among:
        a weight flow rate calculated as a function of the position signal;
        a weight flow rate calculated as a function of the position signal and of at least one of the temperature measurement signals;
        a weight flow rate calculated as a function of the position signal and of at least one of the permittivity measurement signals;
        a weight flow rate calculated as a function of the position signal, of at least one of the temperature measurement signals, and of at least one of the permittivity measurement signals; and
        a weight flow rate calculated as a function of at least one of the temperature measurement signals, of at least one of the permittivity measurement signals, and of at least one of the volume flow rate measurement signals.

2. A control method according to claim 1, wherein the at least one validity criterion comprises a validity criterion for a temperature measurement, a validity criterion for a permittivity measurement, and a validity criterion for a volume flow rate measurement.

3. A control method according to claim 2, wherein the at least one validity criterion further comprises a secondary validity criterion for a volume flow rate measurement, estimated by comparing firstly the weight flow rate calculated as a function of at least one of the temperature measurement signals, of at least one of the permittivity measurement signals, and of at least one of the volume flow rate measurement signals, and secondly the weight flow rate calculated as a function of the position signal, of at least one of the temperature measurement signals, and of at least one of the permittivity measurement signals.

4. A control method according to claim 2, wherein the validity criterion for a temperature measurement is determined by comparing the first and second temperature measurement signals with a temperature measurement range, and the validity criterion for a permittivity measurement is determined by comparing the first and second permittivity measurement signals with a permittivity measurement range.

5. A control method according to claim 4, wherein the validity criterion for a temperature measurement and the validity criterion for a permittivity measurement are also determined as a function of a data set representing density of a fuel as a function of temperature and of permittivity.

6. A control method according to claim 5, wherein, when the temperature or permittivity measurement range and the data set do not indicate that the first and second temperature or permittivity measurement signals are invalid, then the validity criterion for a temperature or permittivity measurement is also determined as a function of the difference between the first and second temperature or permittivity measurement signals.

7. A control method according to claim 2, wherein the validity criterion for a volume flow rate measurement is determined by comparing the first and second volume flow rate measurement signals with a volume flow rate measurement range.

8. A non-transitory computer readable medium including computer executable instructions for executing a method according to claim 1 when executed by a computer.

9. An electronic unit for controlling a turbine engine, comprising a non-transitory computer readable medium according to claim 8.

10. An aeroengine comprising a gas turbine and an electronic unit according to claim 9.

* * * * *